(12) United States Patent
Ogasawara et al.

(10) Patent No.: US 10,050,242 B2
(45) Date of Patent: Aug. 14, 2018

(54) POWER SUPPLY DEVICE (71) Applicant: Yazaki Corporation, Minato-ku, Tokyo (JP)

(72) Inventors: Shigeyuki Ogasawara, Kakegawa (JP); Shinichi Yanagihara, Kakegawa (JP); Michio Ota, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 124 days.

(21) Appl. No.: 14/333,750

(22) Filed: Jul. 17, 2014

(65) Prior Publication Data
US 2014/0329133 A1  Nov. 6, 2014

Related U.S. Application Data
(63) Continuation of application No. PCT/JP2013/000011, filed on Jan. 8, 2013.

(30) Foreign Application Priority Data
Jan. 27, 2012 (JP) ................................ 2012-015339

(51) Int. Cl.
*H01M 2/10* (2006.01)
*H01M 2/20* (2006.01)
*H01M 10/48* (2006.01)

(52) U.S. Cl.
CPC ......... *H01M 2/1077* (2013.01); *H01M 2/206* (2013.01); *H01M 10/482* (2013.01)

(58) Field of Classification Search
None
See application file for complete search history.

(56) References Cited

U.S. PATENT DOCUMENTS 5,804,770 A    9/1998  Tanaka
6,042,062 A *  3/2000  Sugiyama ........... B60R 16/0215
                                            174/72 A
(Continued)

FOREIGN PATENT DOCUMENTS

JP   2011-238544 A   11/2011
WO   2011/142201 A1  11/2011

OTHER PUBLICATIONS

International Search Report for PCT/JP2013/000011 dated May 7, 2013 [PCT/ISA/210].
(Continued)

*Primary Examiner* — Barbara L Gilliam
*Assistant Examiner* — Zhongqing Wei
(74) *Attorney, Agent, or Firm* — Sughrue Mion, PLLC (57) ABSTRACT

A power supply device includes a battery cell assembly being an assembly of battery cells each having electrodes, a battery connecting block including a case body including terminal fixing portions connected to each other via flexural deformation portions and a cover fixed to the case body and configured to cover the terminal fixing portions, and lock portions provided to the cover and the case body with intervals in a longitudinal direction. A lock portion other than lock portions located at two end positions in the longitudinal direction is configured to be capable of locking the cover with the case body with a changeable relative lock position of the cover and the case body in the longitudinal direction.

8 Claims, 12 Drawing Sheets

(56) References Cited

U.S. PATENT DOCUMENTS

| | | | |
|---|---|---|---|
| 6,261,719 B1 * | 7/2001 | Ikeda | H01M 2/202 |
| | | | 429/120 |
| 2006/0178051 A1 * | 8/2006 | Hashida | H01R 13/5213 |
| | | | 439/627 |
| 2013/0071721 A1 * | 3/2013 | Ogasawara | H01M 2/1077 |
| | | | 429/151 |

OTHER PUBLICATIONS

Written Opinion for PCT/JP2013/000011 dated May 7, 2013 [PCT/ISA/237].
Communication dated Sep. 13, 2016, issued by the European Patent Office in counterpart European Application No. 13 704 500.1.

\* cited by examiner

POWER SUPPLY DEVICE

CROSS REFERENCE TO RELATED APPLICATION

This application is a Continuation of PCT Application No. PCT/JP2013/000011, filed on Jan. 8, 2013, and claims the priority of Japanese Patent Application No. 2012-015339, filed on Jan. 27, 2012, the content of both of which is incorporated herein by reference.

BACKGROUND

1. Technical Field

The present invention relates to a power supply device in which electrodes of multiple battery cells are connected to one another.

2. Related Art

Japanese Unexamined Patent Application Publication No. 2011-238544 discloses a related power supply device. The power supply device serving as a drive source of an electric motor is mounted on a hybrid vehicle or an electric vehicle, for example. A related power supply device of this type is illustrated in FIG. 1 to FIG. 5B.

Figure 1:
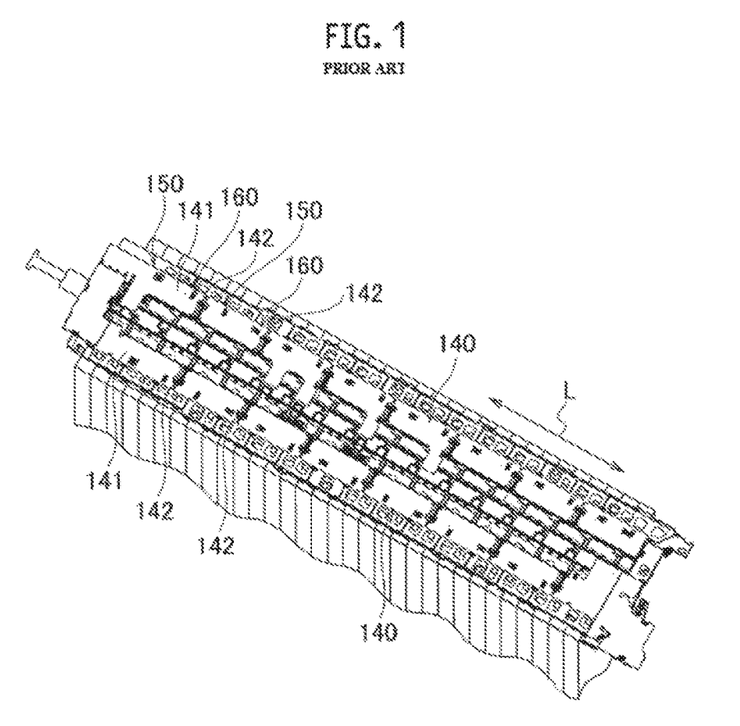
FIG. 1 is a view showing a related example, which is an overall perspective view of a power supply device.
Figure 2:
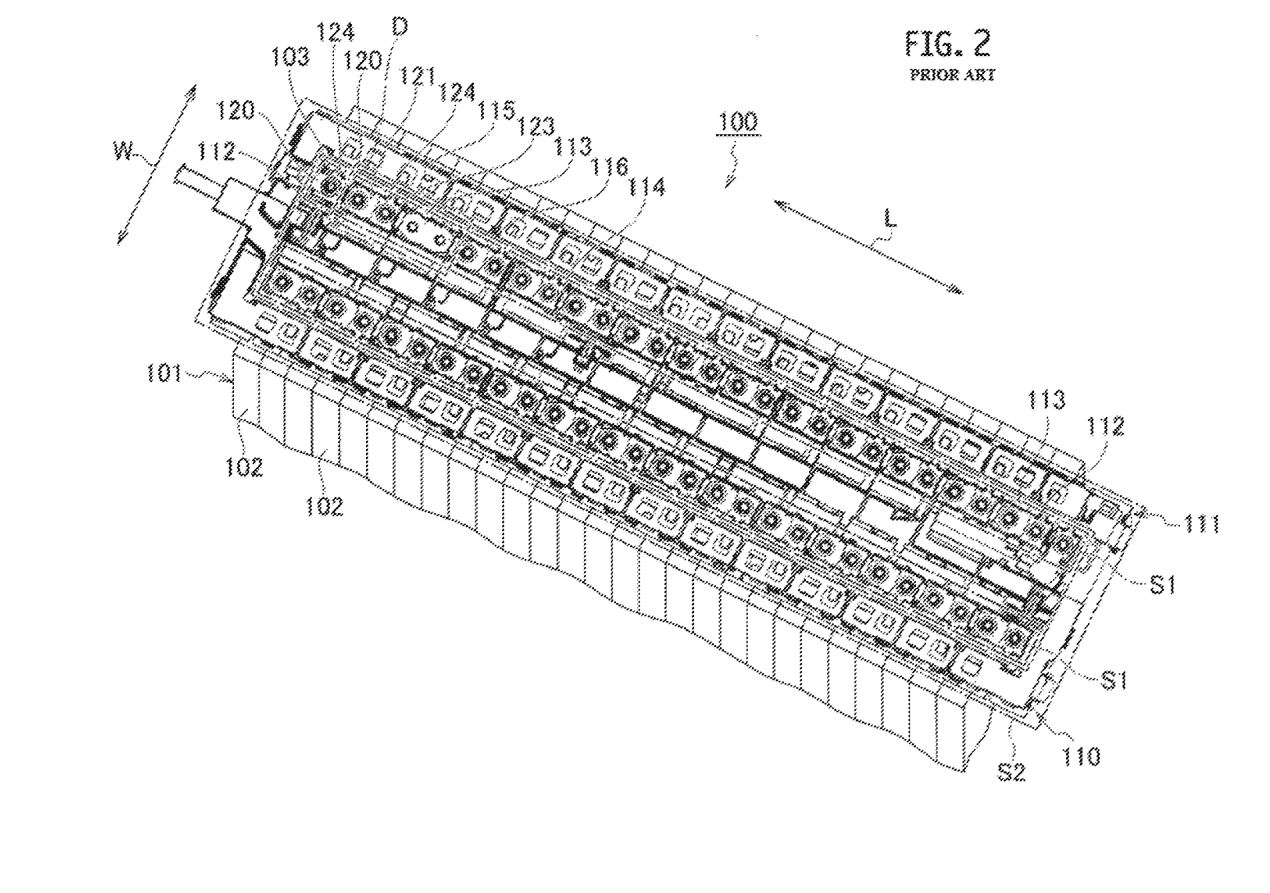
FIG. 2 is a view showing the related example, which is an overall perspective view of the power supply device after removing covers.
Figure 3:
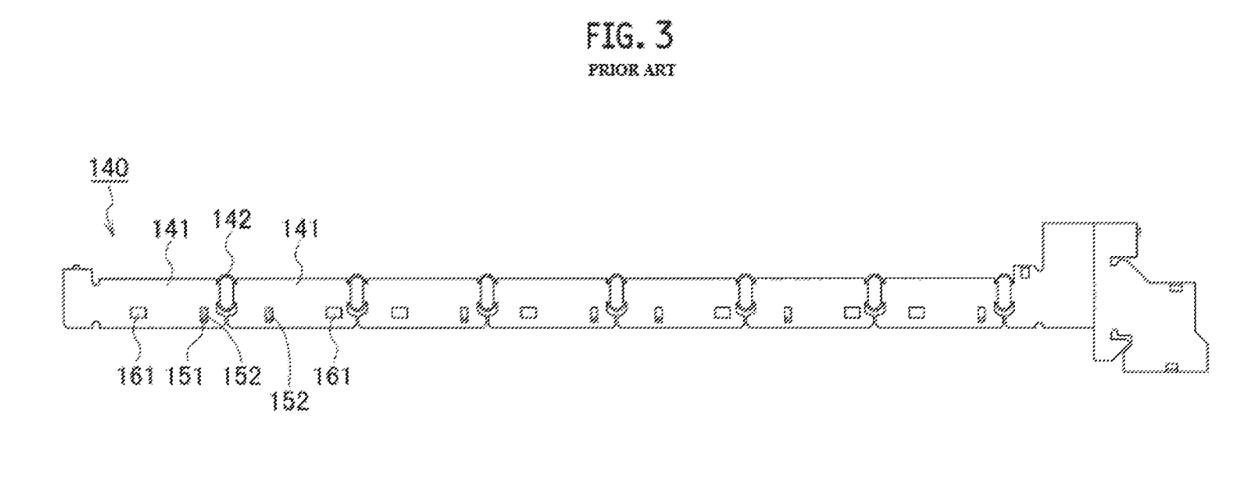
FIG. 3 is a view showing the related example, which is a plan view of a cover.

As shown in FIG. 1 and FIG. 2, a power supply device 100 includes a battery cell assembly 101, and a battery connecting block 110 located on a side of the battery cell assembly 101 where electrodes protrude.

Multiple battery cells 102 are stacked in the same direction in the battery cell assembly 101. Each battery cell 102 includes a pair of electrodes (a positive electrode and a negative electrode) 103 protruding on an upper surface thereof. Each electrode 103 has a shape of a bolt.

The battery connecting block 110 includes a case body 111 made of an insulating resin, multiple connection terminals 121, a pair of output terminals 120, and multiple voltage detecting terminals 123 which are fixed to the case body 111, as well as two covers 140 configured to be fixed to the case body 111 and cover positions where the groups of terminals are placed.

The case body 111 includes a pair of terminal fixing areas S1 arranged in a longitudinal direction L on two end sides in a width direction W, and a wiring area S2 located outside the pair of terminal fixing areas S1 in such a manner as to surround the entire periphery of the pair of terminal fixing areas S1.

Multiple terminal fixing portions 112 and 113 are arranged in a row in each terminal fixing area S1. Every two adjacent terminal fixing portions 112 and 113 are connected to each other via a hinge portion 114 which is a flexural deformation portion. The pair of terminal fixing portions 112 placed on two opposite ends in one of the rows are provided for total power output. Each set of the output terminal 120 and voltage detecting terminal 123 is fixed to the corresponding terminal fixing portion 112 for total power output. The output terminal 120 and the voltage detecting terminal 123 are fastened to a corresponding one of the electrodes 103 located on two ends of the battery cell assembly 101 by using a nut 124. Each set of the connection terminal 121 and voltage detecting terminal 123 is fixed to the corresponding terminal fixing portion 113. The connection terminal 121 is fastened to the electrodes 103 of the adjacent battery cells 102 by using nuts 124, respectively. The voltage detecting terminal 123 is fastened together with the connection terminal 121.

Multiple wire housing portions 115 are continuously arranged in the wiring area S2. Every two adjacent wire housing portions 115 are connected to each other via a hinge portion 116 which is a flexural deformation portion. A voltage detecting wire (not shown) connected to each voltage detecting terminal 123 is routed in the corresponding wire housing portion 115.

The covers 140 are placed in each terminal fixing area S1, namely, placed above all sets of the terminal fixing portions 112 and 113 in the row, respectively.

As shown in FIG. 3 to FIG. 5B, each cover 140 includes multiple split cover portions 141 arranged in a row, and hinge portions 142 each being a flexural deformation portion configured to connect every two adjacent split cover portions 141 to each other.

Figure 4:
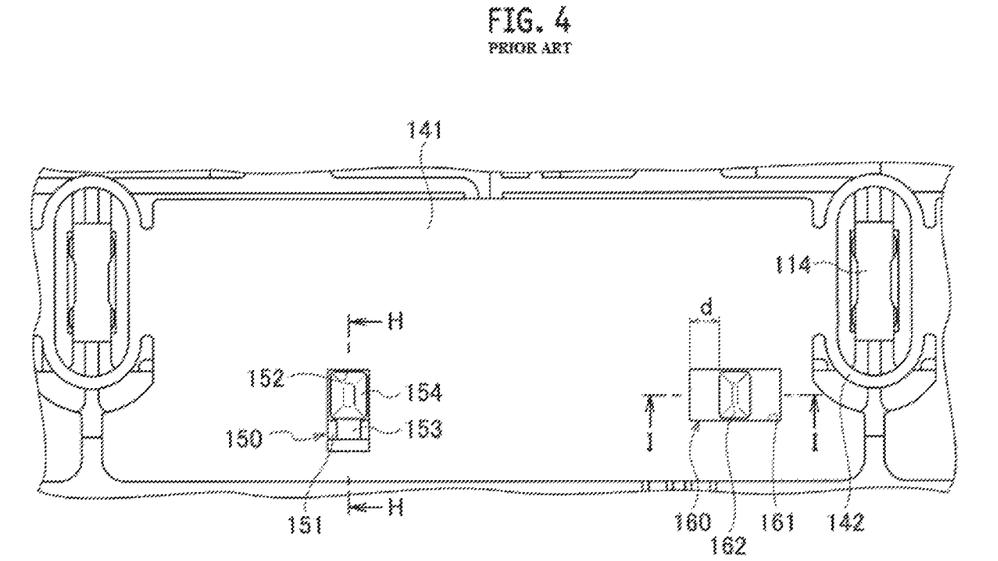
FIG. 4 is a view showing the related example, which is a plan view illustrating how a split cover portion is fixed.

Each split cover portion 141 and the corresponding set of terminal fixing portions 112 and 113 are provided with a set of a lock portion 150 and a position regulating portion 160 located at an interval in the longitudinal direction L.

Figure 5A:
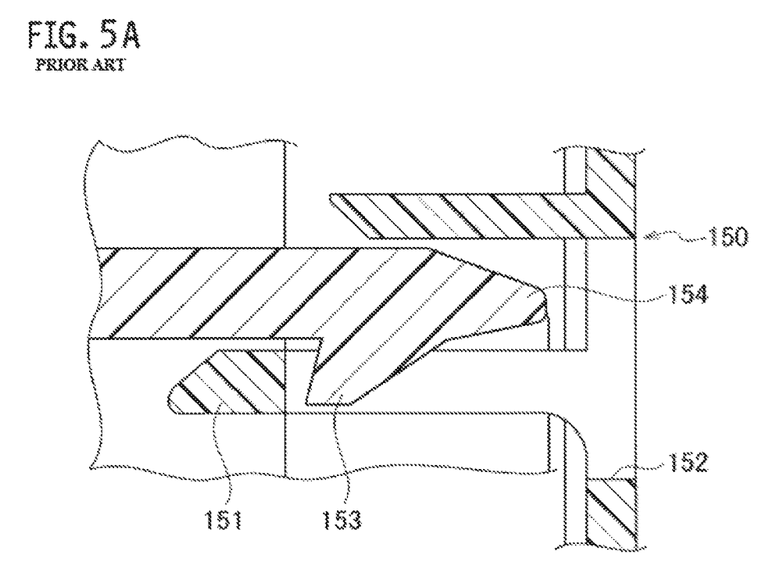
FIG. 5A is a cross-sectional view of FIG. 4 taken along the H-H line.

Each lock portion 150 includes a lock arm portion 151 and a positioning hole 152 provided to the corresponding split cover portion 141, and a lock claw portion 153 and a positioning rib 154 provided to the corresponding terminal fixing portion 112 or 113. The lock claw portion 153 is locked with the lock arm portion 151. The positioning rib 154 on the terminal fixing portion 112 or 113 is inserted into the positioning hole 152 without any gap in the longitudinal direction L. The split cover portion 141 is positioned with respect to the terminal fixing portion 112 or 113 in the longitudinal direction L and is locked with the terminal fixing portion 112 or 113 by the lock portion 150.

Figure 5B:
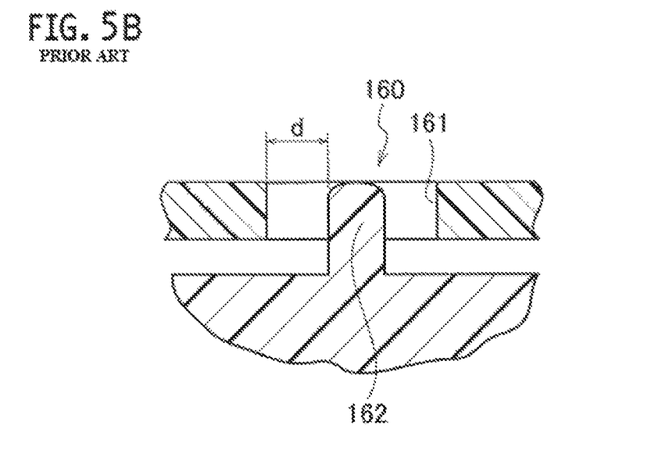
FIG. 5B is a cross-sectional view of FIG. 4 taken along the I-I line.

Each position regulating portion 160 includes a position regulating hole 161 provided to the corresponding split cover portion 141, and a position regulating rib 162 provided to the corresponding terminal fixing portion 112 or 113. The position regulating rib 162 is inserted into the position regulating hole 161 with a gap (2×d) in the longitudinal direction L. The position regulating portion 160 enables the position regulating rib 162 to be inserted into the position regulating hole 161 even if there is a tolerance in assembling the battery cells 102 and the like, whereby the position in the width direction of the split cover portion 141 is regulated with respect to the terminal fixing portion 112 or 113.

In the above-described configuration, even when the dimension in the longitudinal direction L of the battery cell assembly 101 varies due to a tolerance in assembling the battery cells 102 and the like, the case body 111 absorbs the tolerance by flexural deformation of the hinge portions 114 between the terminal fixing portions 112 and 113 as well as the hinge portions 116 between the wire housing portions 115. Meanwhile, even when the dimension in the longitudinal direction L of the battery cell assembly 101 varies due to a tolerance in assembling the battery cells 102 and the like and relative positions of the terminal fixing portions 112 and 113 vary as a consequence, the covers 140 are attached to the case body 111 owing to tolerance absorption achieved by the position regulating holes 161 and the position regulating ribs 162 and tolerance absorption achieved by flexural deformation of the hinge portions 142.

SUMMARY

However, in the power supply device 100, the split cover portions 141 of the covers 140 are fixed to the respective sets of terminal fixing portions 112 and 113 individually and thus are connected together by the numerous hinge portions 142. For this reason, the covers 140 are low in rigidity and easily deformed as a whole.

An object of the present invention is to provide a power supply device including a cover which is less deformable.

A power supply device in accordance with some embodiments includes a battery cell assembly being an assembly of battery cells each having electrodes, a battery connecting block placed on a side of the battery cell assembly where the electrodes are located, the battery connecting block including a case body including terminal fixing portions connected to each other via flexural deformation portions and a cover fixed to the case body and configured to cover the terminal fixing portions, and lock portions provided to the cover and the case body with intervals in a longitudinal direction of the cover and the case body and configured to lock the cover with the case body. Among the lock portions, a lock portion other than lock portions located at two end positions in the longitudinal direction is configured to be capable of locking the cover with the case body with a changeable relative lock position of the cover and the case body in the longitudinal direction.

Among the lock portions, each of the lock portions located in the two end positions in the longitudinal direction may be configured to be capable of locking the cover with the case body with a changeable relative lock position of the cover and the case body in the longitudinal direction. The cover may include split cover portions and a flexural deformation portion connecting adjacent split cover portions of the split cover portions to each other.

Among the lock portions, each of the lock portion located in the two end positions in the longitudinal direction may be configured to lock the cover with the case body with an unchangeable and fixed relative lock position of the cover and the case body in the longitudinal direction. The cover may include split cover portions and a flexural deformation portion connecting adjacent split cover portions of the split cover portions to each other.

Among the lock portions, each of the lock portions located in the two end positions in the longitudinal direction may be configured to be capable of locking the cover with the case body with a changeable relative lock position of the cover and the case body in the longitudinal direction. The cover may be formed of a single member.

Each of the lock portions may include a lock arm portion and a position regulating hole provided to the cover, and a lock claw portion and a position regulating rib provided to the case body. The lock claw portion may be locked with the lock arm portion. The position regulating rib may be disposed in the position regulating hole.

Each of the lock portions may include a clamping rib provided on the cover and configured to clamp the position regulating rib between the clamping rib and the lock arm portion.

According to the above-described configurations, the lock portions located in an intermediate position of the cover and the case body in the longitudinal direction can absorb a tolerance in the longitudinal direction and lock the cover with the case body. Thus, it is possible to provide a cover structure with fewer flexural deformation portions than the related example or a cover structure with no flexural deformation portions. As a consequence, the cover becomes more rigid and therefore less deformable.

DETAILED DESCRIPTION

An embodiment of the present invention will be described below with reference to the drawings.

Embodiment

FIG. 6A to FIG. 12B show an embodiment of the present invention. As shown in FIG. 6A to FIG. 8C, a power supply device 1 includes a battery cell assembly 2 and a battery connecting block 10 located on a side of the battery cell assembly 2 where electrodes protrude.

Figure 7:
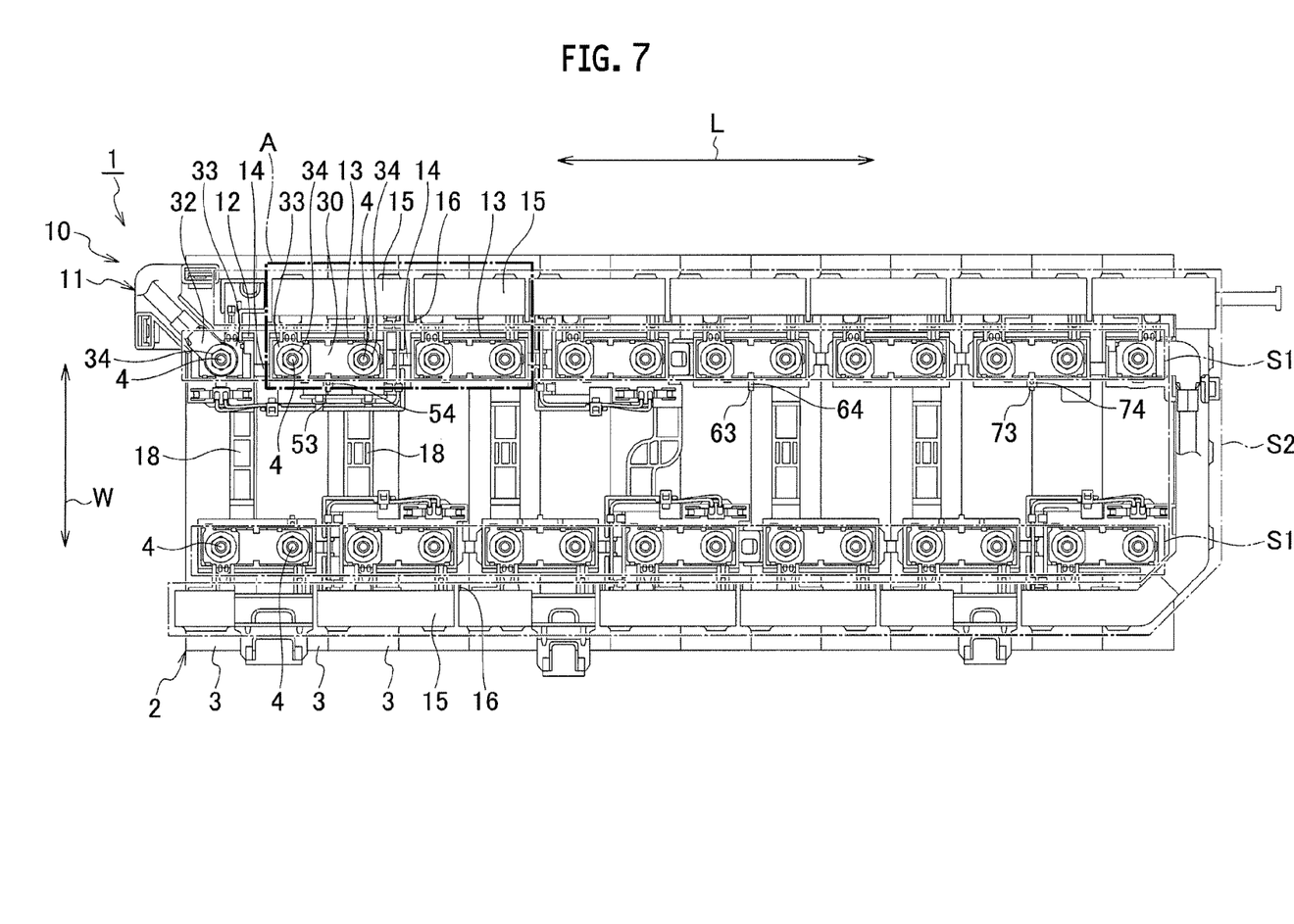
FIG. 7 is a view showing the embodiment of the present invention, which is an overall plan view of the power supply device after removing covers.

The battery cell assembly 2 is an assembly of multiple battery cells 3, in which the multiple battery cells 3 are stacked in the same direction. Each battery cell 3 includes a pair of electrodes (a positive electrode and a negative electrode) 4 protruding on an upper surface thereof. Each electrode 4 has a shape of a bolt.

Figure 6A:
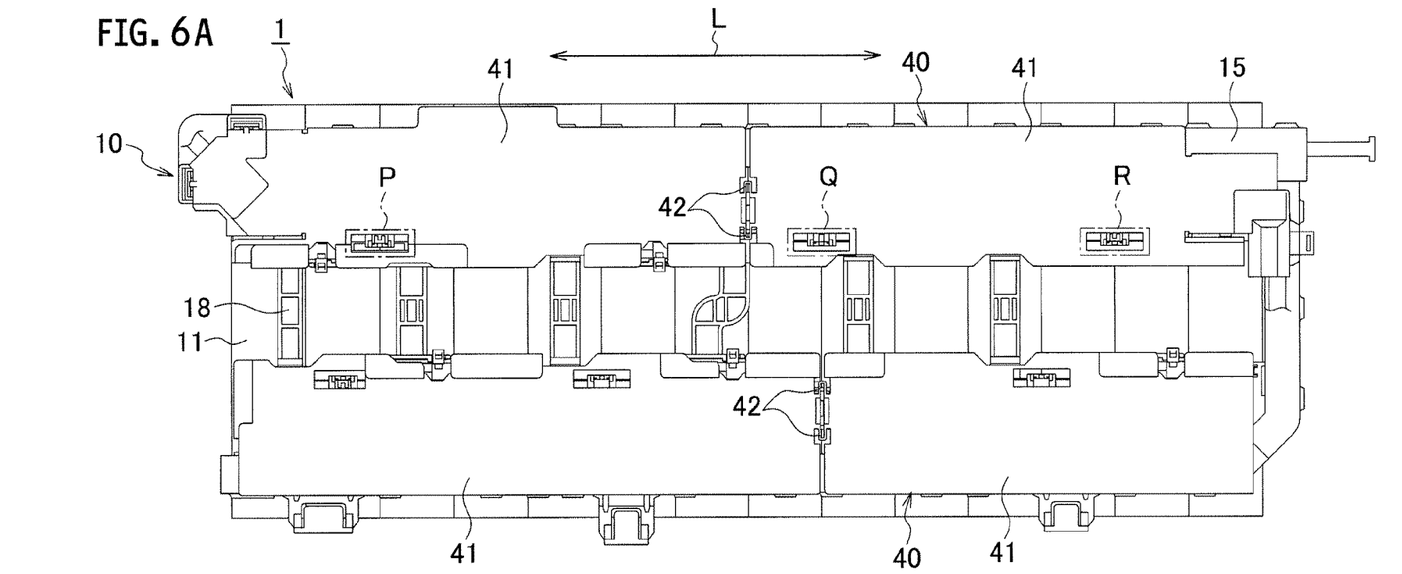
FIG. 6A is an overall plan view of a power supply device according to an embodiment of the present invention.
Figure 6B:
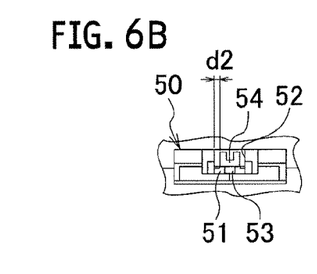
FIG. 6B is a detailed view of the part P in FIG. 6A.
Figure 6C:
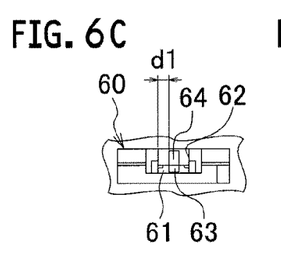
FIG. 6C is a detailed view of the part Q in FIG. 6A.
Figure 6D:
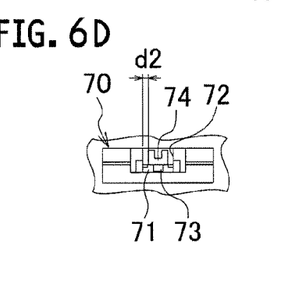
FIG. 6D is a detailed view of the part R in FIG. 6A.

The battery connecting block 10 includes a case body 11 made of an insulating resin, multiple connection terminals 30 fixed to the case body 11, a pair of output terminals 32 fixed to the case body 11, multiple voltage detecting terminals 33 fixed to the case body 11, and two covers 40 configured to be fixed to the case body 11 and cover positions where the terminals 30, 32, and 33 are placed.

The case body 11 includes a pair of terminal fixing areas S1 arranged in a longitudinal direction L on two end sides in a width direction W, and a wiring area S2 located outside the pair of terminal fixing areas S1 and arranged in the form of a "U" shape.

Multiple terminal fixing portions 12 and 13 are arranged in a row in each terminal fixing area S1. Every two adjacent terminal fixing portions 12 and 13 are connected to each other via a hinge portion 14 which is a flexural deformation portion. The pair of terminal fixing portions 12 placed on two opposite ends in one of the rows are provided for total power output. Each set of the output terminal 32 and voltage detecting terminal 33 is fixed to the corresponding terminal fixing portion 12 for total power output. The output terminal 32 and the voltage detecting terminal 33 are fastened to the corresponding one of electrodes 4 located on two ends of the battery cell assembly 2 by using a nut 34. Each set of the connection terminal 30 and voltage detecting terminal 33 is fixed to the corresponding terminal fixing portion 13. One end of each connection terminal 30 is fastened to the electrode 4 of one of the corresponding adjacent battery cells 3 by using a nut 34. The other end of the connection terminal 30 and the corresponding voltage detecting terminal 33 are fastened to the electrode 4 of the other adjacent battery cell 3 by using a nut 34. Thus, the electrodes 4 between the adjacent battery cells 3 are connected by connection terminals 30.

Figure 8A:
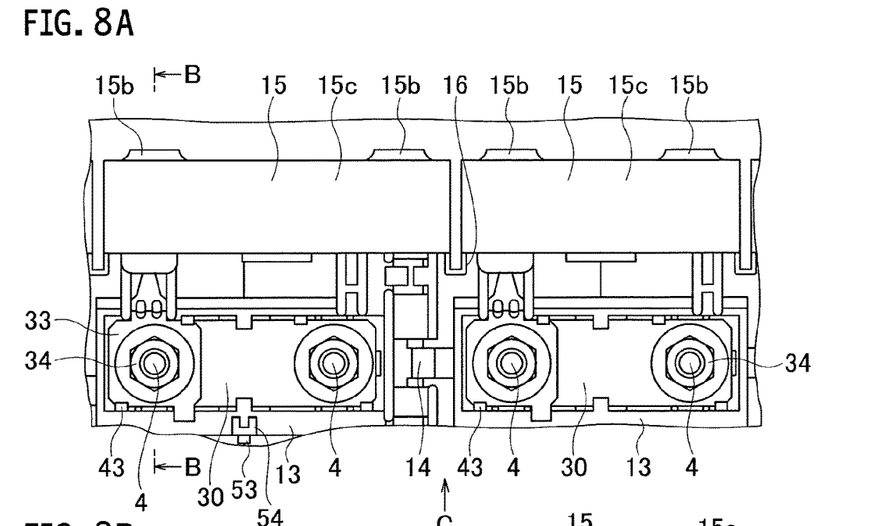
FIG. 8A is an enlarged view of the part A in FIG. 7
Figure 8B:
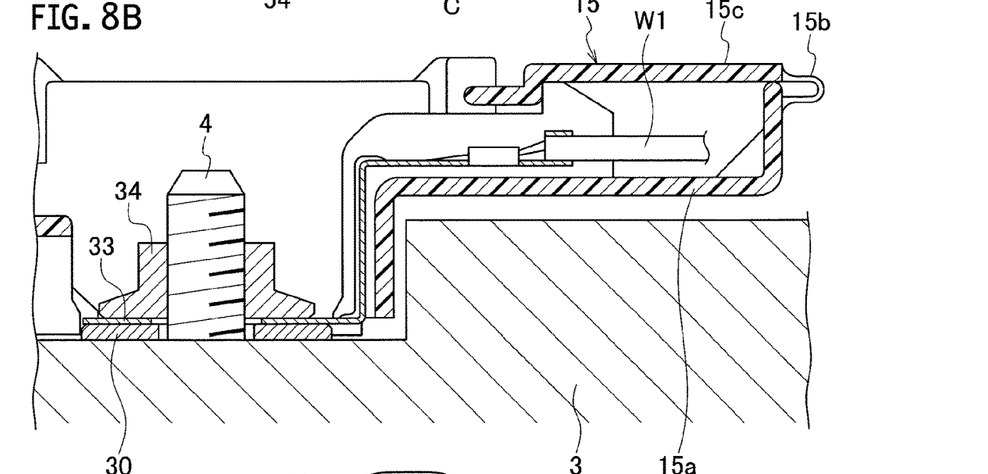
FIG. 8B is a cross-sectional view of FIG. 8A taken along the B-B line
Figure 8C:
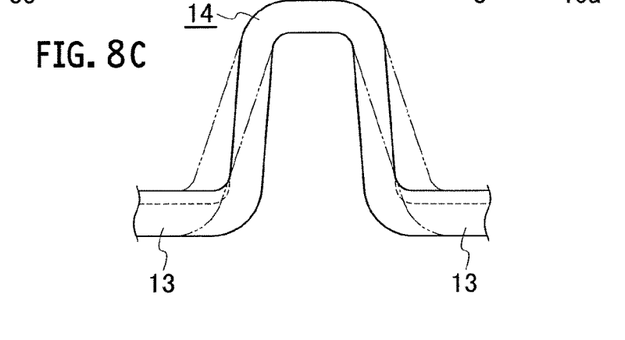
FIG. 8C is a view of a hinge portion viewed from a direction of an arrow C in FIG. 8A.

Each hinge portion 14 can change a gap between the corresponding two adjacent terminal fixing portions 12 and 13 by flexural deformation. The terminal fixing portions 12 and of the respective two rows arranged at substantially corresponding positions are connected to one another via connecting arm portions 18 with some exceptions.

Multiple wire housing portions 15 are arranged in a row in the wiring area S2. Every two adjacent wire housing portions 15 are connected to each other via a hinge portion 16 which is a flexural deformation portion. Each wire housing portion 15 includes a housing base portion 15a, and a lid 15c connected to the housing base portion 15a via a hinge 15b. A voltage detecting wire W1 connected to each voltage detecting terminal 33 is guided to the nearest wire housing portion 15 and is routed by using other wire housing portions 15 continuous from the nearest wire housing portion 15.

Figure 9A:
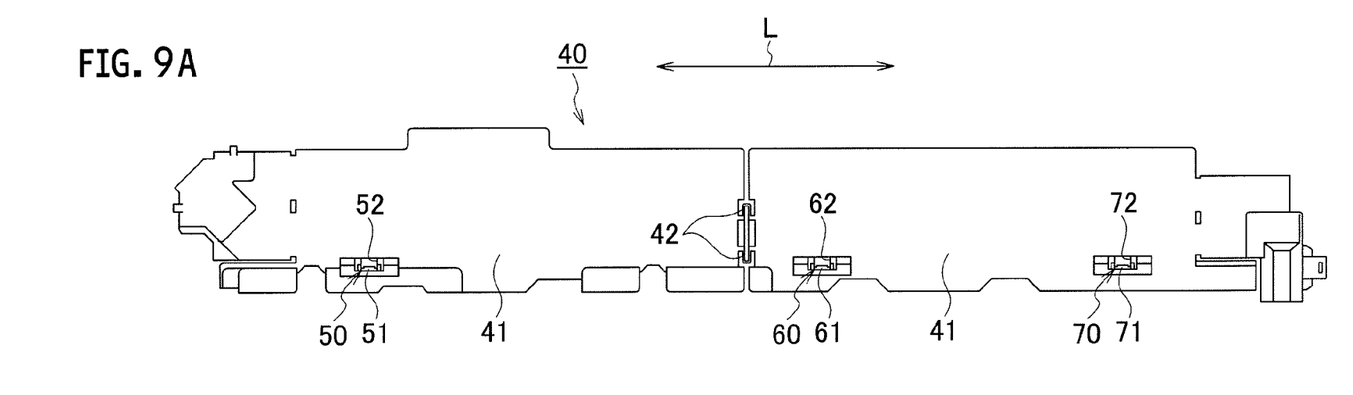
FIG. 9A is a plan view of a cover according to the embodiment of the present invention.
Figure 9B:
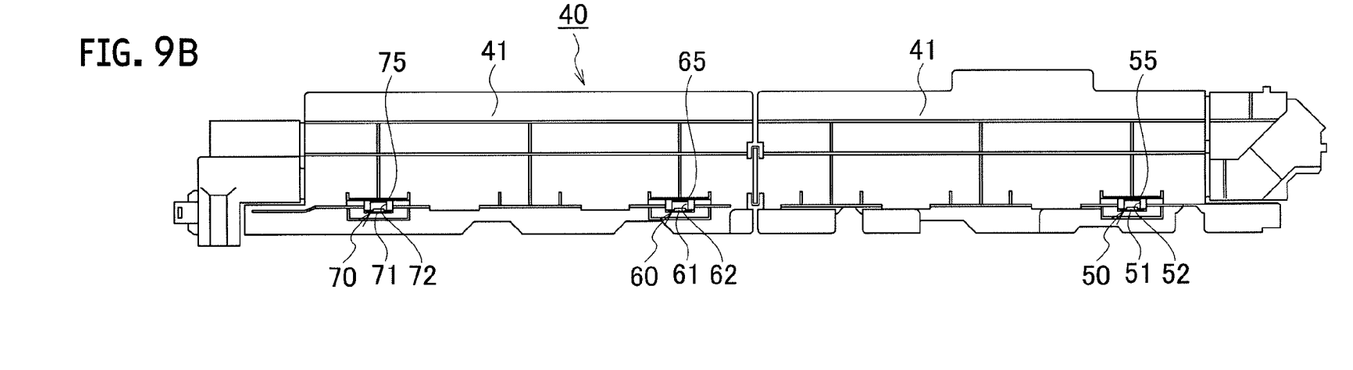
FIG. 9B is a rear view of the cover.

Each cover 40 includes two split cover portions 41, and a hinge portion 42 which is a flexural deformation portion configured to connect the split cover portions 41. Lock portions 50, 60, and 70 are provided in three positions of the two split cover portions 41 and the case body 11 at intervals in the longitudinal direction L.

Figure 10:
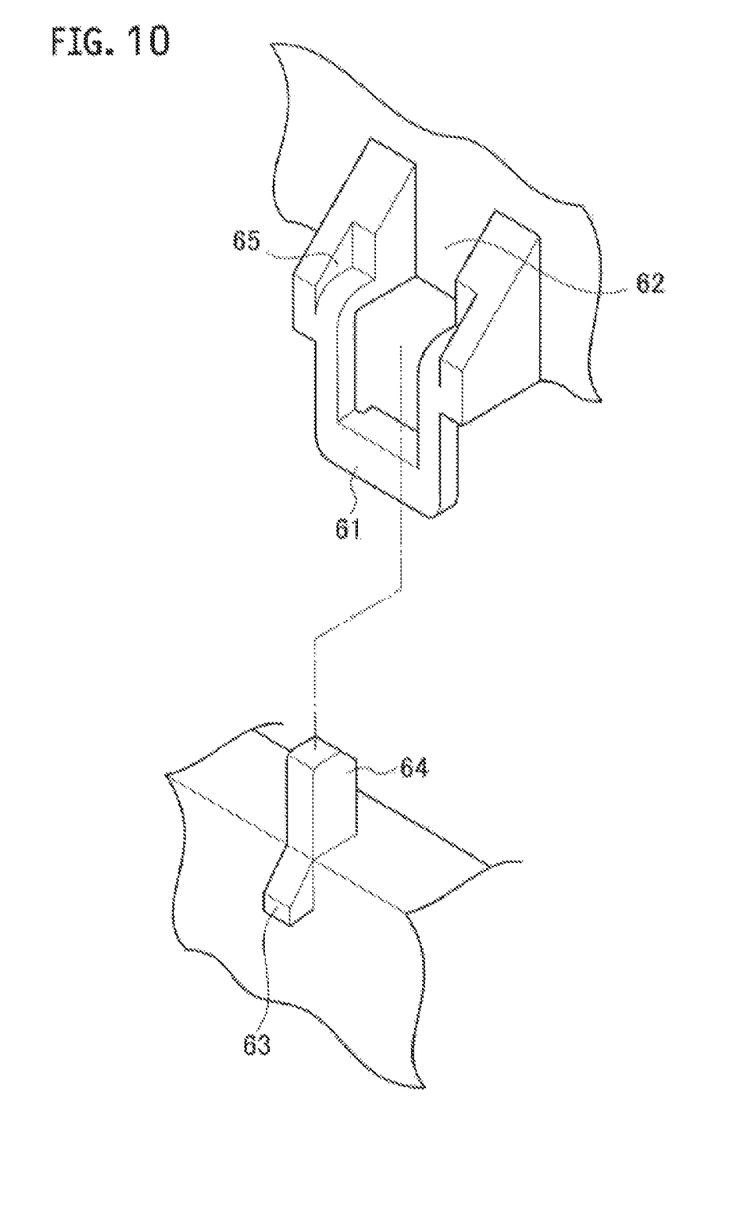
FIG. 10 is a view showing the embodiment of the present invention, which is a perspective view of a lock portion in an intermediate position of the cover.
Figure 12A:
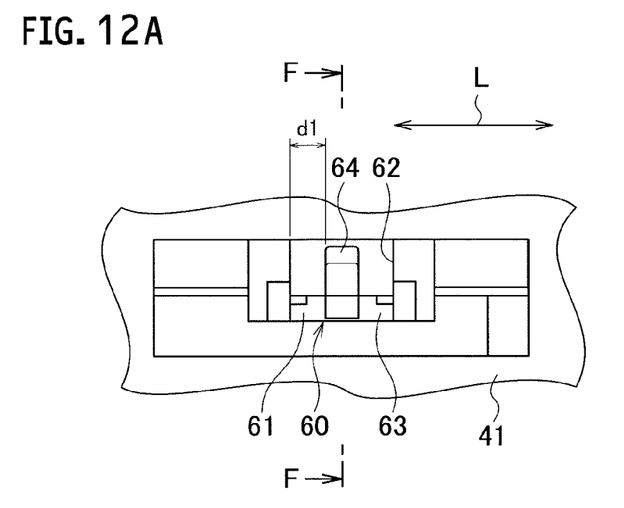
FIG. 12A is an enlarged view of the part Q in FIG. 6A.
Figure 12B:
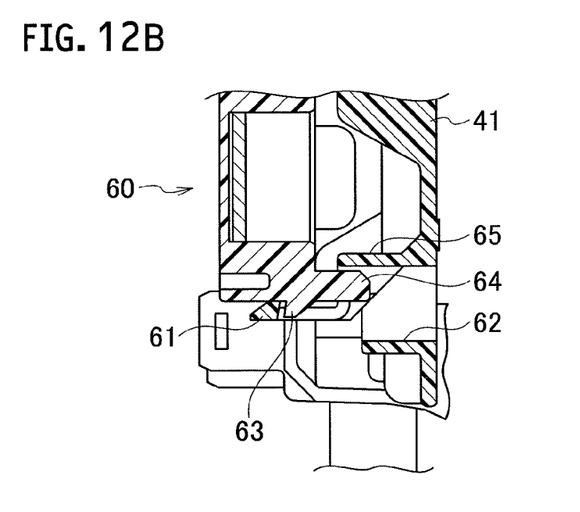
FIG. 12B is a cross-sectional view of FIG. 12A taken along the F-F line.

As shown in detail in FIGS. 10, 12A, and 12B, the lock portion 60 located in a position other than two end positions in the longitudinal direction L, i.e., in an intermediate position, includes: a lock arm portion 61, a position regulating hole 62, and a clamping rib 65 which are provided to the corresponding split cover portion 41; and a lock claw portion 63 and a position regulating rib 64 which are provided to the corresponding terminal fixing portion 13. The lock claw portion 63 is locked with the lock arm portion 61. The position regulating rib 64 on the terminal fixing portion 13 is inserted into the position regulating hole 62 with a gap (2×d1) in the longitudinal direction L. In other words, the lock portion 60 in the intermediate position is configured to be capable of locking the cover 40 with the case body 11 while making relative lock positions of the cover 40 and the case body 11 changeable in the longitudinal direction L. In the meantime, the clamping rib 65 clamps the position regulating rib 64 between itself and the lock arm portion 61.

Figure 11A:
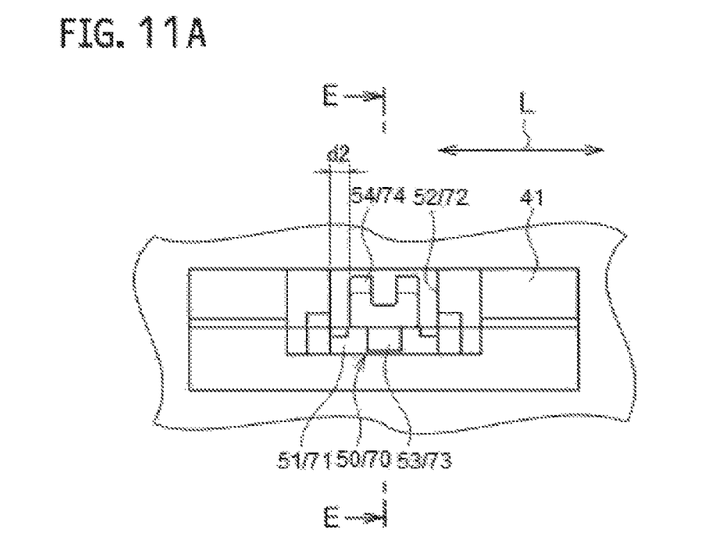
FIG. 11A is an enlarged view of the part P in FIG. 6A.
Figure 11B:
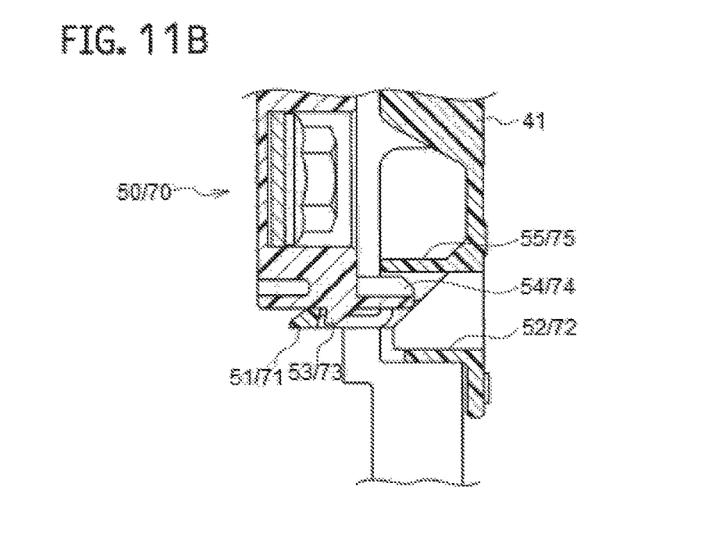
FIG. 11B is a cross-sectional view of FIG. 11A taken along the E-E line.

As shown in detail in FIGS. 11A and 11B, the lock portions 50 and 70 located in the two end positions in the longitudinal direction L include, as similar to the lock portion 60 in the intermediate position: lock arm portions 51 and 71, position regulating holes 52 and 72, and clamping ribs 55 and 75 which are provided to the corresponding split cover portions 41; and lock claw portions 53 and 73 and position regulating ribs 54 and 74 which are provided to the corresponding terminal fixing portions 13. The lock claw portions 53 and 73 are locked with the lock arm portions 51 and 71, respectively. The position regulating ribs 54 and 74 on the terminal fixing portions 13 are inserted into the position regulating holes 52 and 72 with a gap (2×d2) in the longitudinal direction L, respectively. Here, the gap (2×d2) is set to a dimension smaller than the gap (2×d1) defined by the position regulating rib 64 in the position regulating hole 62 (i.e., d1>d2), and such that each terminal fixing portion 12 is prevented from exposure even when the corresponding split cover portions 41 are displaced to the maximum with respect to the terminal fixing portion 12. In the meantime, the clamping ribs 55 and 75 clamp the position regulating ribs 54 and 74 between themselves and the lock arm portions 51 and 71, respectively.

In the above-described configuration, even when the dimension in the longitudinal direction L of the battery cell assembly 2 varies due to a tolerance in assembling the battery cells 3 and the like, the hinge portions 14 between the terminal fixing portions 12 and 13 and the hinge portions 16 between the wire housing portions 15 absorb such a dimensional variation by means of flexural deformation. Meanwhile, even when the dimension in the longitudinal direction L of the battery cell assembly 2 varies due to the tolerance in assembling the battery cells 3 and the like and relative positions of the terminal fixing portions 12 and 13 vary as a consequence, the covers 40 can still be attached to the case body 11 while the tolerance is absorbed by shift of the position regulating ribs 54, 64, and 74 in the position regulating holes 52, 62, and 72 of the lock portions 50, 60, and 70, and by flexural deformation of the hinge portions 42.

As described above, since the lock portion 60 located in the intermediate position in the longitudinal direction L of each cover 40 and the case body 11 can lock the cover 40 with the case body 11 while absorbing the tolerance in the longitudinal direction L, this embodiment can provide a cover structure with fewer hinge portions 42 than the related example. Thus, the rigidity of the cover 40 is increased and the cover 40 becomes less deformable.

The lock portions 50, 60, and 70 include: the lock arm portions 51, 61, and 71 and the position regulating holes 52, 62, and 72 which are provided to the cover 40; and the lock claw portions 53, 63, and 73 and the position regulating ribs 54, 64, and 74 which are provided to the case body 11. Here, the lock claw portions 53, 63, and 73 are locked with the lock arm portions 51, 61 and 71. Moreover, the position regulating ribs 54, 64, and 74 are inserted into the position regulating holes 52, 62, and 72. Accordingly, each of the lock portions 50, 60, and 70 has a locking function as well as a position regulating function and the two functions are located in the same position. This configuration improves workability since a positioning operation and a lock engaging operation can be achieved in a single process. In addition, this configuration can also reduce resin usage.

The lock portions 50, 60, and 70 include the clamping ribs 55, 65, and 75 provided on the cover 40. The clamping ribs 55, 65, and 75 clamp the position regulating ribs 54, 64, and 74 between themselves and the lock arm portions 51, 61, and 71. Accordingly, the clamping ribs 55, 65, and 75 regulate the shift of the lock claw portions 53, 63, and 73 in disengaging directions and thereby minimize unexpected unlocking.

MODIFIED EXAMPLES

In a first modified example, the lock portion 60 located in the intermediate position in the longitudinal direction L of each cover 40 and the case body 11 may be formed as the same as that in the embodiment while the lock portions 50 and 70 located on the two ends in the longitudinal direction may be configured such that the position regulating ribs 54 and 74 are inserted into the position regulating holes 52 and 72 without any gaps in the longitudinal direction L (i.e., a configuration of locking with lock positions fixed and unchangeable). When the dimension in the longitudinal direction L of the battery cell assembly 2 varies due to the tolerance in assembling the battery cells 3 and the like and the relative positions of the terminal fixing portions 12 and 13 vary as a consequence, the cover 40 can still be attached to the case body 11 by the tolerance absorption attributed to the position regulating hole 62 and the position regulating rib 64 of the lock portion 60 located in the intermediate position and by the tolerance absorption attributed to the flexural deformation of the hinge portion 42.

In a second modified example, all the lock portions 50, 60, and 70 on each cover 40 and the case body 11 may be formed as the same as those in the embodiment while the cover 40 may be formed of a single member without including the hinge portion 42 serving as the flexural deformation portion. In other words, this is a cover structure including no hinge portion as the flexural deformation portion. When the dimension in the longitudinal direction L of the battery cell assembly 2 varies due to the tolerance in assembling the battery cells 3 and the like and the relative positions of the terminal fixing portions 12 and 13 vary as a consequence, the cover 40 can still be attached to the case body 11 solely by the tolerance absorption attributed to the position regulating holes 52, 62, and 72 and the position regulating ribs 54, 64, and 74 of the lock portions 50, 60, and 70.

What is claimed is:

1. A power supply device comprising:
a battery cell assembly comprising an assembly of battery cells each having electrodes;
a battery connecting block placed on a side of the battery cell assembly where the electrodes are located, the battery connecting block comprising a case body including terminal fixing portions connected to each other via flexural deformation portions and a cover fixed to the case body and configured to cover the terminal fixing portions; and
lock portions provided to the cover and the case body with intervals in a longitudinal direction of the cover and the case body and configured to lock the cover with the case body,
wherein the flexural deformation portions are flexurally deformable in the longitudinal direction,
wherein among the lock portions, an intermediate lock portion, other than outer lock portions located at two end positions in the longitudinal direction, is configured to maintain a first lock to the case body in the longitudinal direction,
wherein the flexural deformation portions and the intermediate lock portion are configured to absorb a variation in relative positions between the terminal fixing portions in the longitudinal direction, and
wherein the intermediate lock portion absorbs the variation by shifting the first lock along the longitudinal direction of the case body while maintaining the first lock to the case body,
wherein one of the outer lock portions absorbs the variation by shifting a second lock along the longitudinal direction of the case body while maintaining the second lock to the case body,
wherein the other of the outer lock portions absorbs the variation by shifting a third lock along the longitudinal direction of the case body while maintaining the third lock to the case body,
wherein the intermediate lock portion comprises:
a first position regulating hole provided to the cover; and
a first position regulating rib provided to the case body and arranged in the first position regulating hole with a first gap,
wherein the one of the outer lock portions comprises:
a second position regulating hole provided to the cover; and
a second position regulating rib provided to the case body and arranged in the second position regulating hole with a second gap,
wherein the other of the outer lock portions comprises:
a third position regulating hole provided to the cover; and
a third position regulating rib provided to the case body and arranged in the third position regulating hole with a third gap,
wherein the second gap is smaller than the first gap, and
wherein the third gap is smaller than the first gap.

2. The power supply device according to claim 1, wherein the cover comprises:
split cover portions; and
a flexural deformation portion connecting adjacent split cover portions of the split cover portions to each other.

3. The power supply device according to claim 1, wherein among the lock portions, each of the outer lock portion located at the two end positions in the longitudinal direction is configured to lock the cover with the case body with an unchangeable and fixed relative lock position of the cover and the case body in the longitudinal direction, and
the cover comprises:
split cover portions; and
a flexural deformation portion connecting adjacent split cover portions of the split cover portions to each other.

4. The power supply device according to claim 1, wherein among the lock portions, each of the outer lock portions located at the two end positions in the longitudinal direction is configured to lock the cover with the case body with a changeable relative lock position of the cover and the case body in the longitudinal direction, and
the cover is formed of a single member.

5. The power supply device according to claim 1, wherein the intermediate lock portions comprise:
a first lock arm portion provided to the cover; and
a first lock claw portion provided to the case body and locked with the first lock arm portion,
the one of the outer lock portion comprises:
a second lock arm portion provided to the cover; and
a second lock claw portion provided to the case body and locked with the second lock arm portion, and
the other of the outer lock portion comprises:
a third lock arm portion provided to the cover; and
a third lock claw portion provided to the case body and locked with the third lock arm portion.

6. The power supply device according to claim 5, wherein the intermediate lock portion comprises a first clamping rib provided on the cover and configured to clamp the first position regulating rib between the first clamping rib and the first lock arm portion,  the one of the outer lock portion comprises a second clamping rib provided on the cover and configured to clamp the second position regulating rib between the second clamping rib and the second lock arm portion, and  the other of the outer lock portion comprises a third clamping rib provided on the cover and configured to clamp the third position regulating rib between the third clamping rib and the third lock arm portion.

7. The power supply device according to claim 1, wherein the outer lock portions and the intermediate lock portion are configured to simultaneously lock the cover and the case body.

8. The power supply device according to claim 1, wherein the flexural deformation portions comprise hinges.

\* \* \* \* \*